United States Patent
Weinreuter

(10) Patent No.: US 6,644,029 B2
(45) Date of Patent: Nov. 11, 2003

(54) PROCESS FOR CONTROL OF BOOST PRESSURE LIMITATION OF A TURBOCHARGER IN AN INTERNAL COMBUSTION ENGINE AS A FUNCTION OF THE DENSITY OF AMBIENT AIR

(75) Inventor: Bernhard Weinreuter, Bad Rappenau (DE)

(73) Assignee: Audi AG (DE)

( * ) Notice: Subject to any disclaimer, the term of this patent is extended or adjusted under 35 U.S.C. 154(b) by 0 days.

(21) Appl. No.: 10/140,107

(22) Filed: May 8, 2002

(65) Prior Publication Data

US 2002/0166322 A1 Nov. 14, 2002

(30) Foreign Application Priority Data

May 8, 2001 (DE) .......................... 101 22 293

(51) Int. Cl.[7] .............................................. F02D 23/00
(52) U.S. Cl. ..................... 60/602; 60/603; 60/598; 73/118.1
(58) Field of Search .................. 60/600–603, 598; 123/564; 73/118.1

(56) References Cited

U.S. PATENT DOCUMENTS

| 4,848,086 A | * | 7/1989 | Inoue et al. | .................. 60/602 |
|---|---|---|---|---|
| 5,829,254 A | | 11/1998 | Hayashi et al. | ................ 60/602 |
| 6,050,093 A | | 4/2000 | Daudel et al. | ................. 60/602 |
| 6,256,992 B1 | * | 7/2001 | Lewis et al. | ..................... 60/603 |
| 6,272,859 B1 | * | 8/2001 | Barnes et al. | .................. 60/602 |
| 6,298,718 B1 | * | 10/2001 | Wang | ......................... 73/118.1 |
| 6,401,457 B1 | * | 6/2002 | Wang et al. | ................... 60/602 |
| 6,539,714 B1 | * | 4/2003 | Wang | ........................... 60/598 |

FOREIGN PATENT DOCUMENTS

| DE | 197 19 630 A1 | 12/1998 | .................. 60/602 |
|---|---|---|---|
| DE | 197 57 661 C1 | 4/1999 | |
| WO | WO 01/29386 A1 | 4/2001 | |

* cited by examiner

Primary Examiner—Thomas Denion
Assistant Examiner—Thai-Ba Trieu
(74) Attorney, Agent, or Firm—Stevens, Davis, Miller & Mosher

(57) ABSTRACT

A process for the control of boost pressure of a turbocharger in an internal combustion engine as a function of the density of the ambient air. The internal combustion engine has an exhaust gas turbocharger with control means to control the boost pressure in which the actual boost pressure is determined at specific time intervals and compared with assigned values for the desired boost pressure taken from stored compressor characteristics. The boost pressure is adjusted as necessary. The internal combustion engine further comprises an engine control device having a control unit and a data storage unit.

11 Claims, 3 Drawing Sheets

PROCESS FOR CONTROL OF BOOST PRESSURE LIMITATION OF A TURBOCHARGER IN AN INTERNAL COMBUSTION ENGINE AS A FUNCTION OF THE DENSITY OF AMBIENT AIR

DESCRIPTION

The invention relates to a process for control of boost pressure of a turbocharger in an internal combustion engine as a function of the density of ambient air, an internal combustion engine with exhaust gas turbocharger and with control means for control of the boost pressure in which the actual boost pressure is determined at specific time intervals and compared with assigned values for the desired boost pressure taken from stored compressor characteristics and readjusted, and with an engine control device for an internal combustion engine with exhaust gas turbocharger having a control unit for control of the boost pressure and a data storage unit.

BACKGROUND OF THE INVENTION

Control of the boost pressure of an internal combustion engine with a turbocharger is of the state of the art. For example, DE 197 57 661 C1 discloses boost pressure control in an internal combustion engine with turbocharger in which a desired boost pressure is determined from characteristics determined by engine speed and load and is taken into account for control of unstable influences based on dynamic road behavior.

As soon as the supercharger speed exceeds a maximum permissible boundary value for the supercharger speed, a turbocharger can be damaged. Such excessive speed may come about if the vehicle is in operation at higher altitudes in which the ambient pressure falls below a specific minimum pressure or the absorption line of the engine changes radically as a result of leaks from the system. In order to prevent overspeed of the turbocharger in operation at a high altitude, the speed of the turbocharger is usually restricted by limiting the boost pressure as a function of the engine speed and atmospheric pressure. This is accomplished by means of previously recorded characteristics in which the boost pressure is filed on the basis of ambient pressure and engine speed. For this purpose costly tests for determining the characteristics must be carried out in advance for each altitude for every engine having a turbocharger. In addition, fluctuations in air pressure and in ambient temperature must be predicted in the design process.

SUMMARY OF THE INVENTION

The object of the invention is to limit overspeed of the turbocharger in an internal combustion engine having a turbocharger by a simple and reliable process in which allowance is made for atmospheric conditions despite high performance.

It is claimed for the invention that this object is attained both by the process for control of boost pressure limitation of a turbocharger in an internal combustion engine as a function of the density of ambient air in accordance with the characteristics specified in claim 1 and by designing an internal combustion engine having a exhaust gas turbocharger and by means for control of the boost pressure in which the actual boost pressure is determined at specific time intervals and compared with assigned values for the desired boost pressure in a particular operational condition determined from stored compressor characteristics and reset, in accordance with the characteristics specified in claim 9, and by means of an engine control device for an internal combustion engine with exhaust gas turbocharger having a control unit for adjustment of the boost pressure and a data storage unit in accordance with the characteristics specified in claim 10.

As a result, the boost pressure as a function of atmospheric conditions is determined simply at each determination point, with the atmospheric conditions taken into account, and this boost pressure is compared with the maximum boost pressure permissible for this operating condition. Without costly pretesting for determination of a set of characteristics for each individual ambient situation the measured boost pressure may be compared directly with the maximum permissible boost pressure taken from a set of characteristics to determine if the compressor speed is still below the boundary with overspeed and accordingly to prevent further increase when the boundary state is reached.

By preference the process as specified in claim 2, in which the adjusted air mass throughput at the compressor intake may be determined with very good approximation, is to be carried out.

The process as specified in claim 3 permits control and boost pressure limitation in a simple manner by means of the engine control means usually already present as part of the structure, means in which all predetermined data are present and to which all measured data are first delivered through corresponding inputs and from which corresponding control signals for boost pressure control may be forwarded by way of an output.

The process as specified in claim 4 permits especially precise determination of the pressure relationships $P_L P_{VE}$ by taking into account the pressure losses between measuring point and compressor intake. This makes it possible further to minimize the confidence interval between maximum permissible compressor speed and compressor speed as measured. The performance spectrum of the engine may in this way be extended directly to higher levels.

Preference is to be given to the process as specified in claim 5, a process by which it is possible additionally to minimize the danger of short-term occurrence of boost pressure peaks situated above the maximum permissible boost pressure and accordingly the occurrence of short-term compressor speed peaks situated above the maximum permissible value for the compressor speed on the basis of dynamic processes. Overspeed of the compressor as a result of dynamic processes and the speed peaks caused by them can thus be prevented by simple means.

Claims 6 to 8 represent especially advantageous processes for control of boost pressure limitation.

BRIEF DESCRIPTION OF THE DRAWINGS

The invention is described in detail in what follows with reference to the exemplary embodiments presented in FIGS. 1 to 3, of which

DETAILED DESCRIPTION OF THE INVENTION

Figure 1:
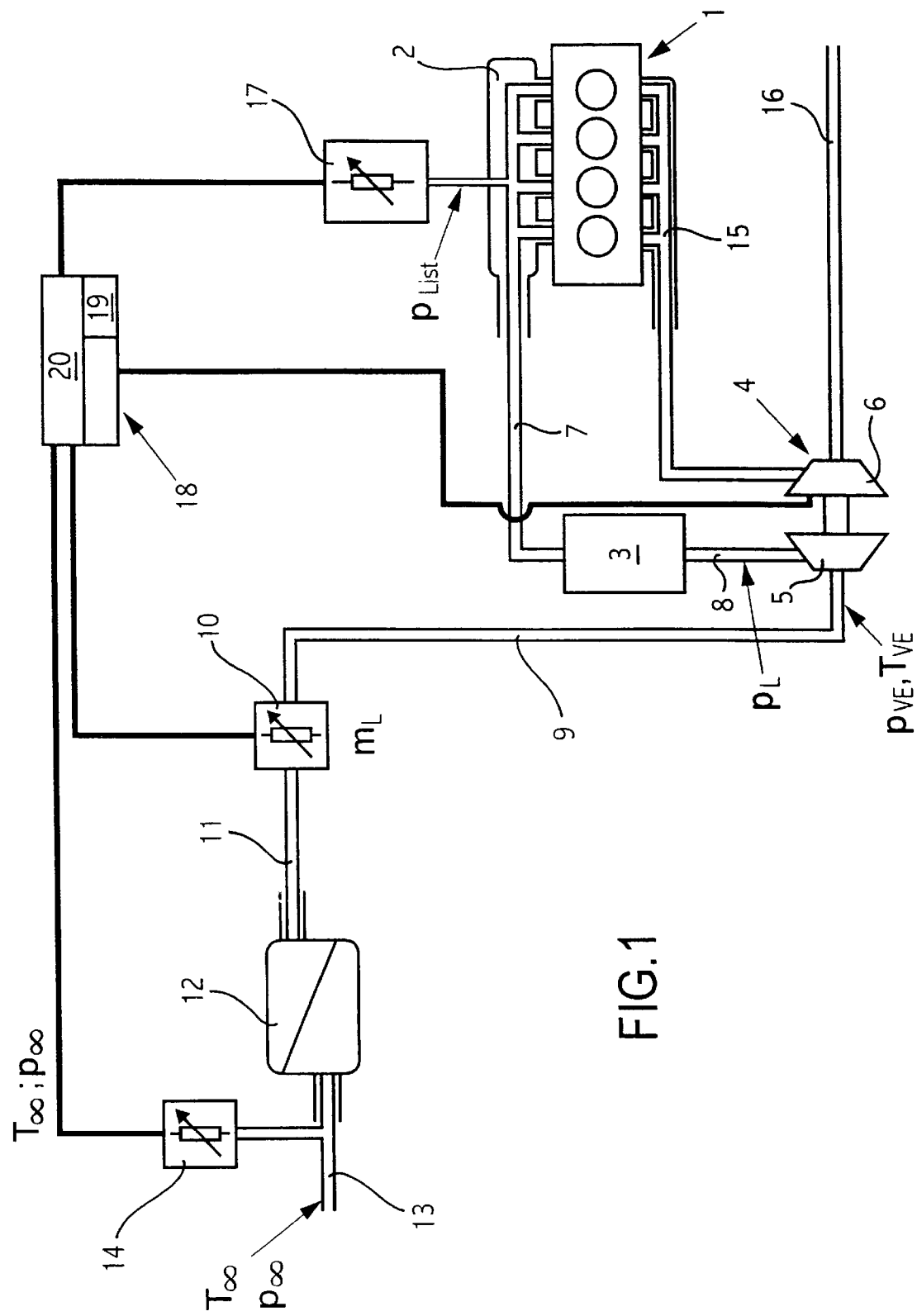
FIG. 1 presents a schematic diagram of an internal combustion engine with turbocharger.

FIG. 1 shows an internal combustion engine 1 to which exhaust gases are transferred by a conventional methods by way of a suction pipe 2 which delivers charged air by way of a turbocharger 4 and from which exhaust gases are delivered by way of a exhaust gas line 15 to the turbine 6 of the turbocharger 4, if supercharging is desired. When the turbocharger 4 is operated, the turbine 6 of the turbocharger 4 is driven by the exhaust gases, the process being accompanied by stress relief, and the exhaust gases are transferred from the turbine 6 by a conventional method by way of a exhaust gas line 16. The turbine 6 of the turbocharger 4 drives the compressor 5 of the turbocharger by a conventional method, as a result of which the air drawn in by way of an air duct 13 and moving through an air filter 12, an air duct 11, an air mass gauge 10, and an air duct 9, is supercharged and while in this supercharged state is delivered by conventional means by way of an air duct 8, a boost air cooler 3, an air duct 7, to the intake pipe 2 and accordingly the engine 1. Supercharging of the boost air by the turbocharger 4 is controlled by state-of-the-art conventional means (not shown) in accordance with the desired performance requirements.

In order to limit the supercharge speed to prevent overspeed of the turbocharger under charged atmospheric conditions, such as at higher altitudes, the supercharger pressure or boost pressure $P_{List}$, the ambient temperature $T_\infty$, and the ambient pressure $P_\infty$, and, by way of the air mass gauge 10, the air mass $m_L$ drawn in and by way of a boost pressure and supercharge air temperature sensor 17 the boost pressure $P_{List}$ are measured in this operational situation. The measurement data are transmitted to the calculation unit 20 of the engine control device 18. The set of compressor characteristics specific to the turbocharger 4 is stored in a databank 19 of conventional design of the engine control device 18.

Figure 3:
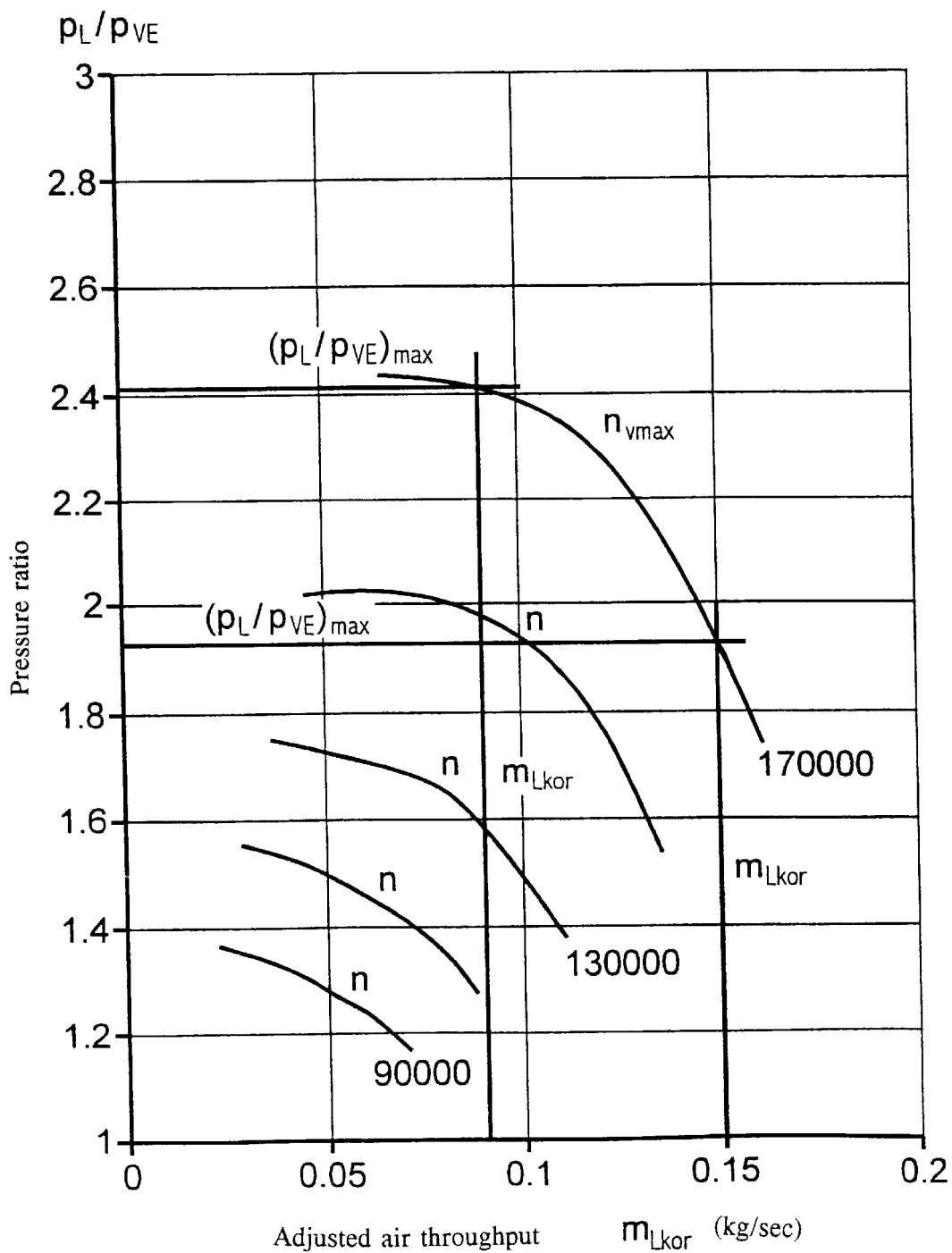
FIG. 3 a qualitative representation of a set of compressor characteristics.

As is to be seen from FIG. 3, this specific set of compressor characteristics shows the characteristic curve of the maximum permissible compressor speed $n_{Vmax}$ plotted against the air mass $m_{Lkor}$, adjusted to the standard condition of the compressor, and the pressure ratio of the boost pressure downstream from the compressor $p_L$ to the pressure upstream from the compressor $P_{VE}$.

Figure 2:
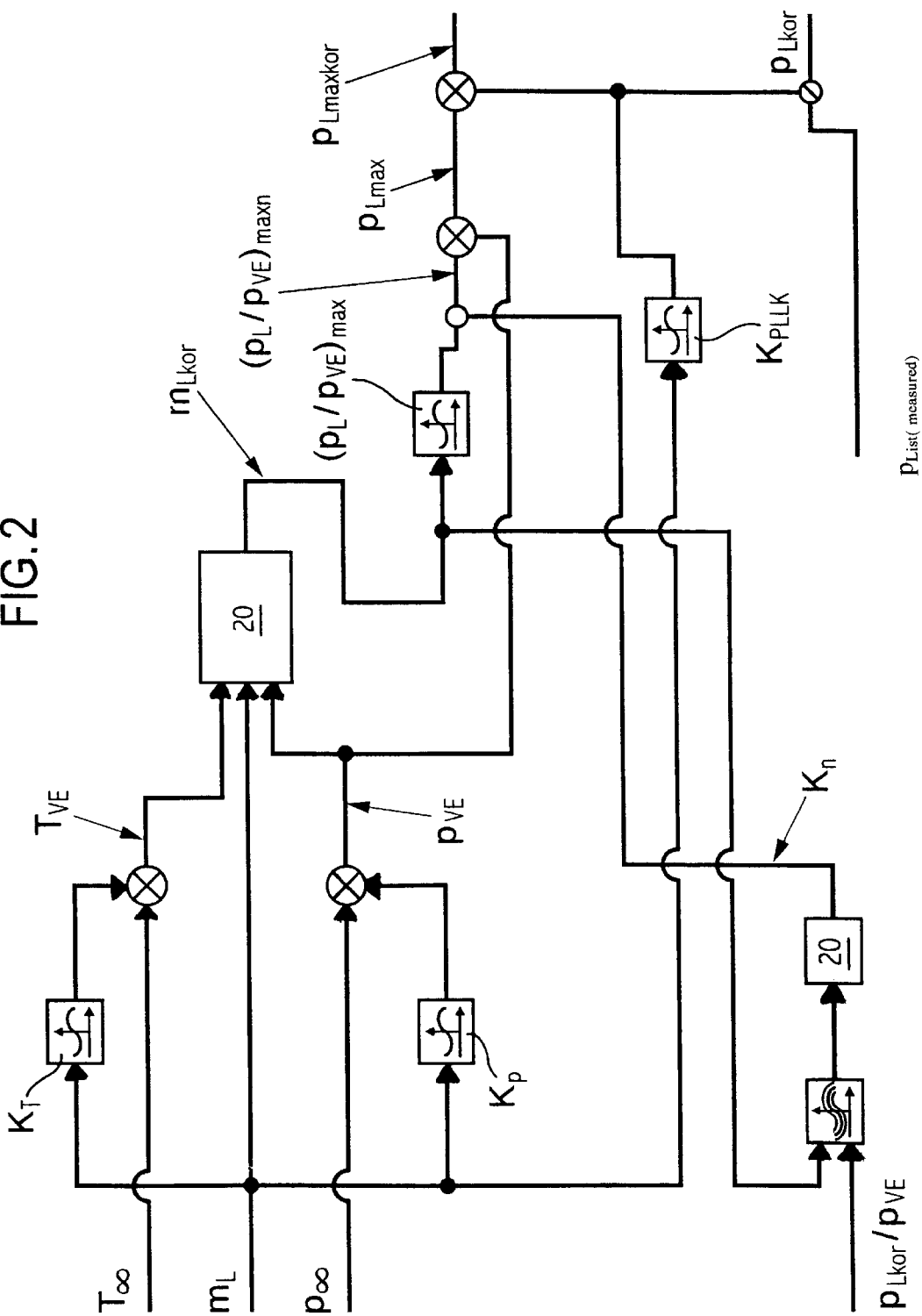
FIG. 2 a control graph illustrating control of boost pressure limitation as claimed for the invention.

As is to be seen from FIG. 2, the temperature at the compressor intake $T_{VE}$ is determined in the calculation unit 20 of the engine control device 18 from the ambient temperature $T_\infty$, allowance being made for a stored, predetermined, air mass dependent correction curve value $K_T$, as also the pressure at the compressor intake is determined from the ambient pressure $P_\infty$ by application of a stored, predetermined, air mass dependent correction curve value $K_P$ at the compressor intake $P_{VE}$.

The correction curves $K_T$ and $K_P$ may, for example, be stored in the form of air mass dependent correction factors. The calculation unit 20 then calculates the air mass throughput at the compressor intake $m_{Lkor}$ adjusted to standard conditions, from the value for the air mass drawn in, $m_L$, the value for the temperature at the compressor intake, $T_{VE}$, and the value for the pressure at the compressor intake, $P_{VE}$, in accordance with the following formula:

$$m_{Lkor} = m_L \cdot ((T_{VE} + 273.15\ K)/T_{OV})^{0.5}/(p_{VE}/P_{OV})),$$

$T_{OV}$ being the standard temperature and $P_{OV}$ the standard pressure of the compressor characteristic. The standard conditions are the conditions under which the compressor characteristic was plotted.

The maximum permissible boost pressure ratio $(p_L/P_{VE})$ of boost pressure $P_L$ to pressure upstream from compressor $P_{VE}$ to be associated with the value determined for the adjusted air mass drawn in at the compressor intake $m_{Lkor}$ at the maximum permissible compressor speed $n_{Vmax}$ is determined from the compressor characteristics stored in the databank 19. By multiplication by the pressure determined upstream from the compressor $P_{VE}$ this value is determined for the maximum permissible boost pressure $P_{Lmax}$ for the air mass throughput at this turbocharger 4.

The computed maximum permissible boost pressure $P_{Lmax}$ is adjusted to an adjusted maximum permissible boost pressure $p_{Lmaxkor}$ in accordance with the equation $$p_{Lmaxkor} = p_{Lmax} \cdot K_{PLLK}, \text{ with } K_{PLLK} = f(m_L),$$

by means of a predetermined correction factor $K_{PLLK}$ stored in the databank 20 [sic] for the boost pressure loss between boost pressure value measured at the position of the boost pressure sensor 17 and the compressor outlet immediately downstream from the compressor 5, in particular because of the high pressure loss in the boost cooler 3.

This corrected, maximum permissible, atmosphere dependent on the boost pressure $P_{Lmaxkor}$ as determined is compared with the measured boost pressure $P_L$.

So long as the boost pressure $P_L$ at downstream of the compressor is smaller than the adjusted maximum permissible adjusted boost pressure $P_{Lmaxkor}$, according to the compressor performance characteristics in FIG. 3, the compressor speed $n_v$ corresponding to this state is smaller than the maximum permissible compressor speed $n_{Vmax}$. Resort to boost pressure adjustment is not yet necessary. As soon as the boost pressure $P_L$ corresponds to the maximum permissible boost pressure $P_{Lmaxkor}$, action is taken so that adjustment for the time being no longer allows boost pressure increase in this condition.

In another embodiment short-term overspeed due to peak boost pressures generated by dynamic processes can be counteracted, after calculation of the maximum permissible pressure ratio $(P_L/P_{VE})_{max}$ or after calculation of the adjusted maximum permissible boost pressure $p_{Lmaxkor}$ allowing for pressure losses, by making an adjustment of the maximum permissible pressure ratio allowing for the gradient of the turbocharger speed over time, through application of a predetermined correction parameter $K_n$ stored in the databank 20 [sic.], so that a corrected, maximum permissible pressure ratio $(P_L/P_{VE})_{maxn}$ taking the speed changes of the supercharger into account is determined, one which corresponds, for example, to the equation $$(P_L/P_{VE})_{maxn} = (P_L/P_{VE})_{max} - K_n,$$

$K_n = f((P_{Lkor}/P_{VE});\ m_{Lkor})$ being additionally filtered.

The gradient is calculated in the calculation unit 20.

In FIG. 1 the air pressure and air temperature sensor 14 is mounted upstream from the air filter 12 in the direction of flow. The air pressure and air temperature sensor 14 may also be provided in any other suitable place for measurement of ambient air pressure and/or ambient temperature. For example, the air pressure and the air temperature may be measured in a position situated downstream from the air filter 12.

In individual instances it may be advisable to equalize the boost pressure sensor with the ambient pressure sensor when the vehicle is not in movement, in order to reduce the tolerance.

LIST OF REFERENCE NUMBERS

1 Internal combustion engine
2 Intake pipe
3 Boost air cooler

4 Turbocharger
5 Compressor
6 Turbine
7 Air duct
8 Air duct
9 Air duct
10 Air mass gauge
11 Air duct
12 Air filter
13 Air duct
14 Sensor for air pressure and air temperature
15 Exhaust gas line
16 Exhaust gas line
17 Sensor for boost pressure and boost air temperature
18 Engine control device
19 Databank
20 Calculation unit

What is claimed is:

1. A process for controlling a boost pressure limitation of a turbocharger in an internal combustion engine as a function of the density of ambient air, comprising the steps of:

determining actual values of the ambient temperature ($T_\infty$), the ambient pressure ($P_\infty$), and a value of an air mass ($m_L$) drawn in;

determining values of a boost pressure ($P_{List}$) at downstream of a compressor in an operating condition at assigned time intervals;

determining actual values of a pressure ($P_{VE}$) at a compressor intake and a temperature ($T_{VE}$) at the compressor intake by way of an air mass predetermined value dependent on correction curves;

adjusting an air mass throughput ($m_{Lkor}$) at the compressor intake to standard conditions from the pressure ($P_{VE}$) determined at the compressor intake, from the temperature ($T_{VE}$) determined at the compressor intake, and from the determined air mass ($m_L$) drawn in, respectively;

comparing a maximum permissible compressor speed dependent on an adjusted maximum permissible boost pressure ($P_{Lmaxkor}$), taken respectively from a compressor characteristics being a maximum compressor speed ($n_{Vmax}$) for adjusting the permissible air mass throughput ($m_{Lkor}$) to standard compressor conditions at the compressor intake and the ambient pressure determined ($P_\infty$), to the boost pressure ($P_{List}$) determined in an operating condition; and controlling the boost pressure ($P_{List}$) so that a maximum value in each instance determined for the boost pressure ($P_{List}$) corresponds to the adjusted maximum permissible compressor speed dependent boost pressure ($P_{Lmaxkor}$) determined in this state.

2. The control process as defined in claim 1 wherein:

the temperature ($T_{VE}$) is determined from the actual value of the ambient temperature ($T_\infty$) at the compressor intake and a predetermined air mass dependent on a correction parameter of the temperature ($K_T$);

the pressure ($P_{VE}$) at the compressor intake is determined from the actual value of the ambient pressure ($P_\infty$) and a predetermined air mass dependent on a correction parameter of the boost pressure ($K_p$); and the adjusted air mass throughput ($m_{Lkor}$) at the compressor intake is determined from the pressure ($P_{VE}$) and air mass ($m_L$) drawn in, in accordance with the formula:

$$m_{Lkor} = m_L \cdot ((T_{VE} + 273.15K)/T_{OV})^{0.5}/(P_{VE}/P_{OV}),$$

wherein $T_{OV}$ is the temperature at the compressor intake under standard compressor conditions and $P_{OV}$ is the pressure at the compressor intake under standard compressor conditions.

3. The control process as defined claim 1 further including:

measuring the actual value of the ambient temperature ($T_\infty$), the actual value of the ambient pressure ($P_\infty$) and the air mass ($m_L$) drawn in and for the boost pressure ($P_{List}$) and transmitting the actual value of the ambient temperature ($T_\infty$) to an engine control device, storing the compressor characteristics and the predetermined correction curves for determining the actual value of the pressure ($P_{VE}$) at the compressor intake and the actual value of the temperature ($T_{VE}$) in the engine control device;

determining the actual value of the pressure ($P_{VE}$) at the compressor intake and the actual value of the temperature ($T_{VE}$), the adjusted air mass throughput ($m_{LVE}$) at the compressor intake, and the compressor speed dependent on a maximum permissible boost pressure ($P_{Lmax}$); and generating control signals for controlling the boost pressure in the engine control device.

4. The control process as defined in claim 1 further including:

measuring the boost pressure ($P_{List}$) in a boost air duct between a boost air cooler and a combustion chamber of the internal combustion engine; and adjusting a pressure loss between the compressor intake and the boost pressure when the determined value of the boost pressure ($P_{List}$) is compared with a respective compressor speed value dependent on the determined value of a maximum permissible boost pressure ($P_{Lmax}$);

wherein during the adjustment, an adjusted maximum permissible boost pressure ($P_{Lmaxkor}$) with a correction characteristics dependent on the air mass throughput ($m_L$) at the compressor intake is determined, and then the adjusted maximum permissible boost pressure ($P_{Lmaxkor}$) is compared with the determined value of the boost pressure ($P_{List}$); and wherein the adjusted maximum permissible boost pressure ($P_{Lmaxkor}$) being determined by a correction factor ($K_{PLLK}$) dependent on the air mass throughput ($m_L$) determined at the compressor intake for the boost pressure loss in a boost air cooler, in accordance with the equation:

$$P_{Lmaxkor} = P_{Lmax} \cdot K_{PLLK}, \text{ with } K_{PLLK} = f(m_L).$$

5. The control process as defined in claim 1 further including:

comparing the determined value of the boost pressure ($P_{List}$) with a respective compressor speed dependent on a maximum permissible boost pressure ($P_{Lmax}$) and counteracting a short-term overspeed due to peak boost pressures generated by changing the engine speed over time; wherein an adjusted maximum permissible pressure ratio (($P_L/P_{VE})_{maxn}$) with a predetermined correction function ($K_n$) is determined to allow for the gradient of the engine speed (n) over time (t);

wherein the adjusted maximum permissible pressure ratio (($P_L/P_{VE})_{maxn}$) is in accordance with the equation:

$$(P_L/P_{VE})_{maxn} = (P_L/P_{VE})_{max} - K_n, \text{ with } K_n = f((P_{Lkor}/P_{VE}); m_{Lkor})$$

and (($P_L/P_{VE})_{maxn}$) being a maximum permissible ratio.

6. The control process as defined in claim 1 further including:
a built-in air filter disposed in a compressor intake path, and
determining the actual value of the ambient temperature ($T_\infty$) and the actual value of the ambient pressure ($P_\infty$) upstream from the air filter in the direction of the intake air flow.

7. The control process as defined in claim 1 further including:
an air mass gauge disposed in a compressor intake path, and
determining the actual value of the ambient pressure ($P_\infty$) downstream from the air filter in the direction of the intake air flow and determining the actual value of the ambient temperature ($T_\infty$) in the air mass gauge.

8. The control process as defined in claim 1 further including:
adjusting the value determined by a boost pressure sensor for measuring boost pressure ($P_{List}$) to be equal to the value determined by an ambient pressure sensor for measuring ambient pressure ($P_\infty$) when the vehicle is at rest.

9. An internal combustion engine with an exhaust gas turbocharger and a control device for adjusting a boost pressure for which respectively an actual boost pressure is determined and compared with assigned values in a respective operational state taken from a stored compressor characteristics, wherein:
the control device is in data connection with means for determining a value of the ambient temperature ($T_\infty$), a value of the ambient pressure ($P_\infty$) from an air mass drawn in ($m_L$), and a value of the boost pressure ($P_{List}$);
the control device has means for recording such data at assigned intervals;
the control device is in data connection with a databank for storing a predetermined air mass value dependent on correction parameters of the boost pressure ($K_p$) and the temperature ($K_T$) at the compressor intake of the turbocharger and with the stored compressor characteristics with respective predetermined relationships between the air mass drawn in ($m_L$) and a ratio of boost pressure to ambient pressure ($P_{List}/P_\infty$) at various compressor speeds ($n_V$) and at a maximum permissible compressor speed ($n_{Vmax}$) of the turbocharger;
wherein the control device has means:
for respectively determining a value of a pressure ($P_{VE}$) at a compressor intake from the ambient pressure ($P_\infty$) and a corresponding boost pressure correction parameter ($K_p$) of the pressure ($P_{VE}$) at the compressor intake,
for respectively determining a value of the temperature ($T_{VE}$) at the compressor intake from the ambient temperature ($T_\infty$) determined and a corresponding temperature correction parameter ($K_T$),
for respectively determining an actual value of an adjusted air mass throughput ($m_{Lkor}$) at the compressor intake from the air mass drawn in ($m_L$), from the pressure ($P_{VE}$) as determined at the compressor intake and from the temperature ($T_{VE}$) as determined at the compressor intake,
for respectively determining a maximum permissible boost pressure ($P_{Lmax}$) of the adjusted maximum permissible air mass throughput ($m_{Lkor}$) from the compressor characteristics being a maximum permissible compressor speed ($n_{Vmax}$) at the compressor intake, and from the ambient pressure ($P_\infty$) as determined, and
for respectively comparing the boost pressure ($P_{List}$) as determined with the respective compressor speed dependent maximum permissible boost pressure ($P_{Lmax}$); and
the control device is connected to a means for building-up and modifying the boost pressure, and
the control device has a control mechanism for setting an upper limit of built-up boost pressure, wherein the control mechanism acts on the means for building-up and modifying the boost pressure so that the boost pressure ($P_{List}$) does not exceed an determined maximum permissible boost pressure ($P_{Lmaxkor}$).

10. The internal combustion engine as defined in claim 9 wherein the control device and the databank are part of the engine control equipment.

11. An engine control device for an internal combustion engine with an exhaust gas turbocharger, a control unit for controlling the boost pressure and a databank,
wherein the control unit records data regarding a value of the ambient temperature ($T_\infty$), a value of the ambient pressure ($P_\infty$), a value of the air mass ($m_L$) drawn in, and a value of the boost pressure ($P_{List}$) at assigned time intervals;
wherein the control unit is data connected for data acquisition to the databank to store a predetermined air mass dependent on correction parameters for the boost pressure ($K_p$) and the temperature ($K_T$) at a compressor intake of the turbocharger and a stored compressor characteristic with the respective predetermined relation at various compressor speeds ($n_V$) and at a maximum permissible compressor speed ($n_{Vmax}$) of the turbocharger, between air mass ($m_L$) drawn in and the ratio of the boost pressure to the ambient pressure ($P_{List}/P_\infty$),
wherein the control unit has means
for respectively determining a value of a pressure ($P_{VE}$) at the compressor intake from the data acquired for the ambient pressure ($P_\infty$) and the corresponding boost pressure correction parameter ($K_p$) of the pressure ($P_{VE}$) at the compressor intake,
for respectively determining a value of a temperature ($T_{VE}$) at the compressor intake from the data acquired for the ambient temperature ($T_\infty$) and the corresponding temperature correction parameter ($K_T$),
for respectively determining an actual value of the actual value for an adjusted air mass throughput ($m_{Lkor}$) at the compressor intake from the data acquired for the air mass ($m_L$) drawn in as determined, from the pressure ($P_{VE}$) as determined at the compressor intake and from the temperature ($T_{VE}$) as determined at the compressor intake,
for determining a maximum permissible boost pressure ($P_{Lmax}$) for the adjusted air mass throughput ($m_{Lkor}$) at the compressor intake from the compressor characteristics being the maximum permissible compressor speed ($n_{Vmax}$) at the compressor intake and from the ambient pressure ($P_\infty$) as determined, and
for respectively comparing the boost pressure ($P_{List}$) as determined with a respective compressor speed dependent on the maximum permissible boost pressure ($P_{Lmax}$); and the control unit has a data connection for transmitting data to means for building-up and modifying the boost pressure; and the control unit has a control mechanism for setting an upper limit of a built-up boost pressure, wherein the control mechanism generates control data acting on the means for building-up and modifying the boost pressure so that the compressor speed dependent on the maximum permissible boost pressure ($P_{Lmax}$) will not be exceeded.

* * * * *